3,368,876
SEPARATING ASPHALTENE COATED WATER-SOLUBLE SOLIDS FROM AN OIL PHASE

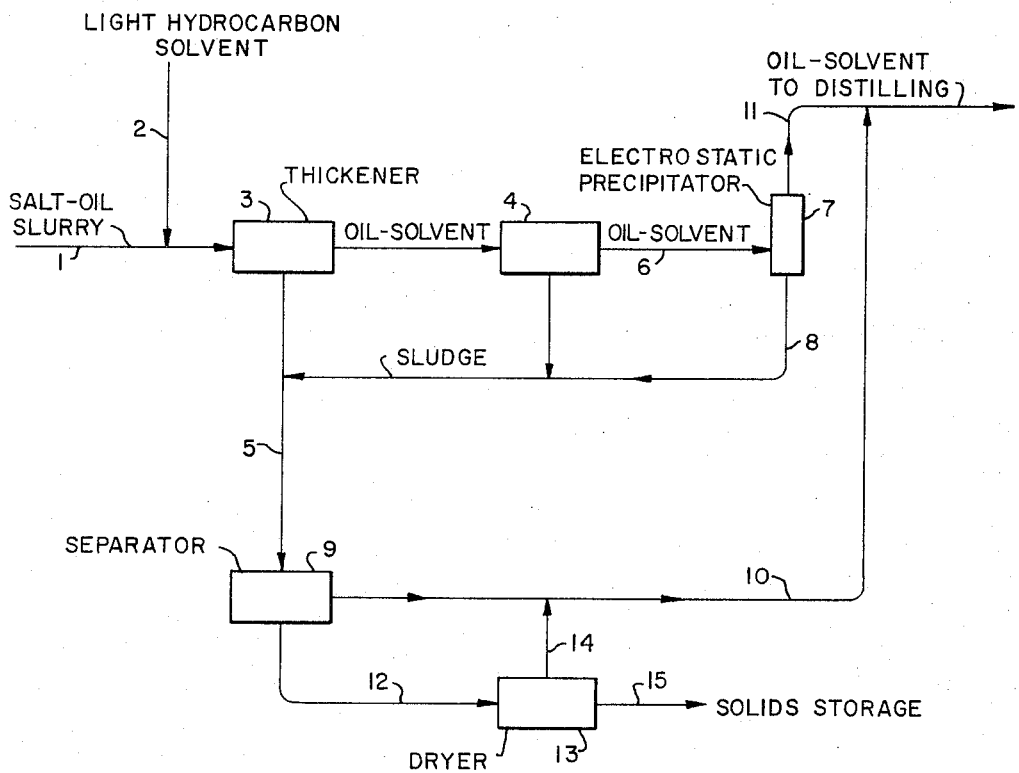

William A. Bailey, Jr., Houston, Tex., assignor to Shell Oil Company, New York, N.Y., a corporation of Delaware
Filed June 21, 1965, Ser. No. 465,445
3 Claims. (Cl. 23—300)

ABSTRACT OF THE DISCLOSURE

An improved method of separating water-soluble solids slurried in an asphaltene-containing hydrocarbon oil for pipeline transportation, the improvement residing in separating said solids at the terminal end of the pipeline by diluting said oil slurry with a light hydrocarbon so as to cause precipitation of the solids and thereafter removing said precipitated solids from the oil.

---

The invention relates to the recovery of solid materials, such as potassium chloride, potash, potash salts, sodium chloride, soda ash, sodium sulphate, phosphate rock and coal from their dispersion as finely divided particles in oil. The invention finds application, for example, in the separation of such solids from crude or refined oil after having been dispersed in such oil for transportation through a pipeline.

Such solid materials in granular form can be transported by dispersing them in oil and pumping the resulting slurry through a pipeline. When the particles have a tendency to settle or rise in the oil and insufficient turbulence can be maintained to hold them in suspension, the suspension may be aided by suitable expedients, such as the formation of an aqueous brine suspension in the carrier oil (see U.S. patent to Cross, No. 2,610,900) or the addition of surfactants or the formation of porous agglomerates of the granules which may be bonded to each other by a small, film-forming amount of water which may itself contain a surfactant. At the delivery end of the pipeline, the material must be recovered from the oil.

One of the better techniques employed to effect the recovery of this material from the oil has been settling. However, the methods of settling this material currently in practice are inefficient and fail to solve one of the bigger problems connected with the transportation of solid material as a slurry in a pipeline, namely the undesirable size of a large portion of the recoverd particles of material. Muriate of potash (sylvite) or any other solid can be transported in a pipeline as an oil slurry, provided the particulate matter is small enough and in sufficiently high concentration to prevent rapid settling. As might be expected, the small particle size of the solids that yields a good slurry makes recovery of the solids difficult and in some cases may require particles of such size as to limit severely the use of the recovered solids. In the case of muriate of potash (KCl) transported in a crude oil slurry, approximately one-half of the solids are of a particle size too small to be suitable for commercial fertilizer application. Therefore, recovery also involves reconstitution of the particulate material to particles of a larger size.

The present invention presents an improved technique for recovering dispersed solid materials from oil which contains undesirable constituents that can be precipitated by light hydrocarbons and is applicable to oil slurries of any of the types previously mentioned. The technique set forth is a method by which (1) the separation of the solids and oil is hastened and improved; (2) the oil stream is upgraded in quality; and (3) the recovered particles have desirable characteristics as a result of a hydrocarbon film.

According to the invention, a light hydrocarbon stream is added to the slurry in order to (1) dilute the slurry and lower its viscosity; (2) reject those undesirable constituents of the oil that are insoluble in the diluent (de-asphaltening); and (3) coat the settling particles with the rejected asphaltenes. The settled, coated particles are then removed from the (supernatant) oil and dried prior to further processing.

The light hydrocarbon stream should be paraffin-rich and preferably consists predominantly or essentially of one or more paraffinic hydrocarbons having from one through five carbon atoms, e.g. propane, butane and pentane. However, the invention is not limited to this preferred class but may be used with other hydrocarbons boiling below 400° F., e.g. hexane, heptane, octane, and/or a petroleum naphtha. When the light hydrocarbon stream is added to the slurry, thereby diluting it, the viscosity of the oil which suspends the material decreases, thereby causing the material to settle more readily. The fluid velocity of the diluted slurry is then decreased by passing it through an enlarged chamber for a time sufficient to permit the particles contained therein to settle. At the same time, the unedesirable constituents within the transporting fluid, crude oil in most cases, will be precipitated out of the oil by the light hydrocarbons. These precipitating constituents then coat the settling solid particles with a film of hydrocarbon. The percentage by weight of the settled, dried particles formed by the coating of precipitated constituents depends upon several variable factors in the operating conditions, e.g. the amount of asphaltenes in the oil, the concentration of solids carried in the slurry, the particular hydrocarbons used as solvent and the solvent-oil ratio. These percentages might normally be expected to be in the range of 0.1 to 25% by weight of the dried particles. In a laboratory experiment, a 40% by volume solids KCl-in-oil slurry was diluted with n-pentane in an amount to increase the volume five-fold and allowed to settle. The dried particles were found to contain from 1 to 2% by weight hydrocarbon in the form of a film.

Water-soluble particulates are improved by this process of acquiring a coating of hydrocarbon in that they will more readily agglomerate, their significant hygroscopicity will be lessened, their dry-flow characteristics are made more satisfactory and their relatively high rate of solution in water is reduced. In an experiment designed to compare the amount of water absorbed, the oil-coated KCl absorbed only 73% as much water as did the un-coated material (18 hours at 100% relative humidity). Other experiments showed that the rate of solution in water (weight dissolved/weight contacted/time of contact) of the oil-coated KCl, when compared to that of the original material, varied from 0 to 19% reduction. While no quantitative measure of the flow characteristics was made, the recovered KCl exhibited superior qualities in this respect.

After a suitable induction period (settling time), the settled, coated particles can be concentrated, removed and processed for distribution. The oil would be further processed to remove any additional contamination, then sent to distillation where the diluent would be removed to be recycled to the slurry.

The invention will be further described with reference to the accompanying drawing forming a part of this specification, the single view of which is a flow diagram of an illustrative embodiment.

Referring to the drawing, the slurry to be treated, such as a carrier of crude oil containing constituents such as asphaltenes capable of being precipitated by light hydrocarbons, and having dispersed therein particles of a solid material, such as sylvite (technical potassium chloride) discharged from a pipeline, is continuously added to the slurry from a line 2 thereby diluting the slurry and lowering its viscosity. The diluted slurry is then passed to a separator, such as thickeners 3 and 4, wherein the solid particles settle and become coated with the precipitating constituents and from which they are discharged into a common line 5. The diluted supernatant oil may then be passed via a line 6 to an electrostatic precipitator 7 which completes the precipitation process and which also produces a quantity of settled, coated particles which are discharged into line 8 leading to the line 5. The latter conveys the coated particles to a separator 9 of any suitable type, such as a centrifuge or a filter.

This potassium chloride sludge which is discharged into line 5 consists of a concentration of settled, coated potassium chloride particles in a mixture of oil and light hydrocarbon. As this sludge is passed through separator 9, the solid particles are further concentrated and the resulting oil and light hydrocarbon solution is discharged into a line 10. This solution is carried thence into the liquid efflux line 11 from the precipitator 7 for admixture therewith. The combined liquid flow is then optionally subjected to further processing to remove any additional contamination. It is then sent to a distillation step where the diluent is removed to be recycled to the slurry. The coated, solid particles of potassium chloride are carried from the separator 9 via a line 12 to a dryer 13 wherein they undergo a drying process, whereby oil and diluent are removed; these may be introduced into the stream in line 10 via a line 14. The dried and coated solids are discharged at 15 and moved to storage.

Although the invention was particularly described for use with a water-soluble, inorganic salt, it is not so limited. Other types of solids can be advantageously separated from a crude oil-containing slurry. For example, coal can be transported as a slurry in crude oil and the mixture separated by deasphaltening as described above. The less desirable components, asphaltenes, of the crude oil would be precipitated and eventually burned with the coal.

The process described above can be modified if desired when transporting materials more inert than muriate of potash, e.g. coal. In this case, acid would be added with the solvent to yield acid asphaltenes. Some definite advantages for the use of acid are a lower solvent requirement and better nitrogen removal from the crude oil. However, the use of acid in the solvent would be limited to slurries of the more inert materials because of the acid-salt reactivity which would be encountered with most inorganic salts, such as muriate of potash.

I claim as my invention:

1. The method of transporting an oil slurry of water-soluble solid particles through a pipeline by forming an oil slurry by the addition to said oil of a substantially large amount of water soluble solid particles, said water-soluble solid particles selected from the group consisting of potassium chloride, potash, potash salts, sodium chloride, soda ash, sodium sulphate, phosphate rock and coal, being added in a hydrocarbon oil containing asphaltenes and injecting the slurry into the pipeline, the improvement residing in separating at the terminal end of the pipeline the water-soluble solid particles from the oil by forcing the slurry into a separator and diluting said slurry therein with a light paraffinic hydrocarbon boiling below 400° F. in an amount sufficient to cause precipitation of the asphaltenes from the oil which coat said water-soluble solids and thereafter separating said asphaltene coated water-soluble solids from the oil phase.

2. The method of claim 1 wherein the water-soluble solid particles in the oil slurry comprise at least 40% of the slurry mixture, the diluent is a paraffinic hydrocarbon having 3 to 5 carbon atoms and the amount of diluent used is from 1 to 5 times that of the oil present in the slurry mixture.

3. The method of claim 2 wherein the water-soluble particles are sylvite and after separation from the oil slurry are dried and are coated with a 0.1–25% asphaltic film.

References Cited

UNITED STATES PATENTS

| | | | |
|---|---|---|---|
| 1,812,629 | 6/1931 | Gifford | 208—262 |
| 2,070,626 | 2/1937 | Shoemaker | 208—180 |
| 2,650,931 | 9/1953 | Dron | 210—21 |
| 2,729,589 | 1/1956 | Waghorne | 208—309 |
| 2,774,722 | 12/1956 | Buckland | 210—21 |
| 3,153,623 | 10/1964 | Eldib | 208—180 |
| 2,853,426 | 9/1958 | Peet | 208—309 |

NORMAN YUDKOFF, *Primary Examiner.*

G. HINES, *Assistant Examiner.*